United States Patent [19]

Morris

[11] Patent Number: 4,971,396

[45] Date of Patent: Nov. 20, 1990

[54] WHEEL HUB COVER APPARATUS

[76] Inventor: Thomas C. Morris, 8605 Evanston, Raytown, Mo. 64138

[21] Appl. No.: 471,861

[22] Filed: Jan. 29, 1990

[51] Int. Cl.$^5$ .............................................. B60B 7/00
[52] U.S. Cl. ................................. 301/37 S; 301/108 S
[58] Field of Search ................. 301/37 R, 37 S, 37 P, 301/37 SC, 37 SS, 108 R, 108 S, 108 A, 108 SC

[56] References Cited

U.S. PATENT DOCUMENTS

| | | | |
|---|---|---|---|
| 1,474,632 | 11/1923 | House, Jr. | 301/108 S |
| 2,044,654 | 6/1936 | Whited | 301/37 SX |
| 2,249,568 | 7/1941 | Sitinliver | 301/63 DX |
| 2,617,698 | 11/1952 | Gaines | 301/108 R |
| 3,671,076 | 6/1972 | Aske, Jr. | 301/37 P |

FOREIGN PATENT DOCUMENTS 570113 1/1933 Fed. Rep. of Germany ... 301/9 DN

*Primary Examiner*—Russell D. Stormer
*Attorney, Agent, or Firm*—Hovey, Williams, Timmons & Collins

[57] ABSTRACT

For use with a wheel having a hub adapted to be secured to a mounting structure by at least one stud extending through a hole in the hub and by a nut fastened to the stud, the hub including a first surface facing the mounting structure and a second surface opposed to the first surface, a wheel hub cover appartus for protecting a portion of the hub adjacent the hole against exposure to fluids includes structure for sealing each surface of the hub adjacent the hole. On the first surface of the hub, a gasket is provided which is adapted to be interposed between the wheel hub and the mounting structure during attachment of the wheel to the mounting structure so that the portion of the hub adjacent the hole is protected from exposure to fluids that are present in the vicinity of the first surface of the hub. A cover protects the portion of the hub adjacent the hole from exposure to fluids that are present in the vicinity of the second surface of the hub, and includes an edge adapted to contact the second surface of the hub along a closed path surrounding the periphery of the hole and defining a region of the second surface of the hub that is protected by the cover from exposure to fluids that are present in the vicinity of the second surface of the hub.

9 Claims, 1 Drawing Sheet

WHEEL HUB COVER APPARATUS

BACKGROUND OF THE INVENTION

1. Field of the Invention

The present invention relates generally to wheel hub covers and, more particularly, to a wheel hub cover apparatus for use in protecting at least a portion of a wheel hub from exposure to fluids that are in the vicinity of the hub such that the effects of oxidation on the protected portion of the hub are reduced or eliminated.

2. Discussion of the Prior Art

In certain known types of agricultural irrigation systems, towers are used to support large water lines for movement within a predetermined area in which irrigation is to be carried out. In these systems, the tower or towers supporting the water lines each include a pair of wheels that support the tower and the water line for movement over the ground during the irrigation process so that the entire area is exposed to the irrigation system and a complete and thorough watering of the area is carried out. One specific example of such an irrigation system is the pivot-type irrigation system in which a plurality of spaced towers are driven to move an irrigation line along a pivotal path around a point located generally centrally of the field to be irrigated.

Because the environment in which the towers of such irrigation systems are employed is very wet and frequently includes brackish water and corrosive chemicals, the wheels provided on the towers are commonly exposed to fluids that cause oxidation or rusting of the metal in the wheels. This oxidation of the wheels is especially prevalent in the region of the connection points between the hubs and the mounting structure of the towers since the holes formed in the hubs present additional surface area that is susceptible to rusting. Such rusting in the vicinity of the connection points between the hubs and a mounting structure of the towers can result in catastrophic failure of the irrigation system if and when the hubs rust through to a degree sufficient to cause the wheel to fall from its secured position on the tower.

One solution to the problem of oxidation of the wheels of an irrigation system of the type described is simply to replace the wheels of the system frequently enough to avoid such catastrophic failures. This solution is implemented at a relatively high cost due to the need for replacing the entire wheel, and sometimes both wheels of each tower assembly, each time oxidation or rusting progresses to an undesirable level.

OBJECTS AND SUMMARY OF THE INVENTION

It is an object of the present invention to reduce or eliminate the amount of oxidation and rusting which occurs in wheels of the above-mentioned irrigation systems, and to provide a wheel hub cover apparatus for use with these systems which protects the hubs of the tower wheels from oxidation and rusting in the area of attachment of the hubs to the towers.

According to one aspect of the invention, a wheel hub cover apparatus is provided for use with a wheel having a hub adapted to be secured to a mounting structure by at least one stud extending through a hole in the hub and by a nut fastened to the stud, the hub including a first surface facing the mounting structure and a second surface opposed to the first surface. The wheel hub cover apparatus is assembled on the wheel to protect a portion of the hub adjacent the hole against exposure to fluids, and includes first sealing means adapted to extend around the periphery of the hole and between the first surface of the hub and the mounting structure when the hub is secured to the mounting structure for protecting the portion of the hub adjacent the hole from exposure to fluids that are present in the vicinity of the first surface of the hub.

Second sealing means are provided in the wheel hub cover apparatus for protecting the portion of the hub adjacent the hole from exposure to fluids that are present in the vicinity of the second surface of the hub. The second sealing means includes a cover having an edge adapted to contact the second surface of the hub along a closed path surrounding the periphery of the hole and defining a region of the second surface of the hub that is protected by the cover from exposure to fluids that are present in the vicinity of the second surface of the hub.

By this construction numerous advantages are realized. For example, by protecting both surfaces of the hub adjacent each hole passing therethrough, the critical region of each hub adjacent the attachment points of the hub is shielded from brackish water and corrosive chemicals and is preserved for a longer period of time than are these same regions of the known systems. Thus, the useful life of the wheels of the system is lengthened and the cost of maintaining such systems is reduced.

BRIEF DESCRIPTION OF THE DRAWING FIGURES

A preferred embodiment of the wheel hub cover apparatus of the present invention is discussed in detail below with reference to the attached drawing figures, wherein.

DETAILED DESCRIPTION OF THE PREFERRED EMBODIMENT

Figure 1:
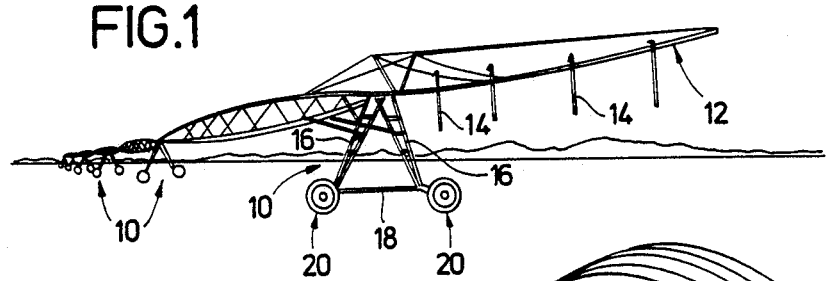
FIG. 1 is a perspective view of a pivot-type irrigation system in which a wheel hub cover apparatus constructed in accordance with the present invention may be employed.

A pivot-type irrigation system is illustrated in FIG. 1, which is capable of use with the wheel hub cover apparatus of the present invention. As shown in the figure, the irrigation system includes a plurality of towers 10 supporting an irrigation line 12 and a plurality of distribution sprinklers 14 or the like.

Each tower 10 is of a generally inverted V-shape construction having a pair of downward extending legs 16 which are connected by a horizontal member 18. A wheel 20 is connected to each leg 16 of the tower to support the tower above the ground and the wheels 20 permit movement of the tower across the ground. Preferably, at least one of the wheels 20 on each tower 10 is connected to a gear shaft of a drive mechanism supported on the tower so that a driving force is transmitted to the wheel 20 to carry out the movement of the tower 10. This drive mechanism is not shown in the drawing figures, but it is understood that the mechanism is of conventional construction and is controlled by known means to carry out any desired movement of the towers.

Figure 2:
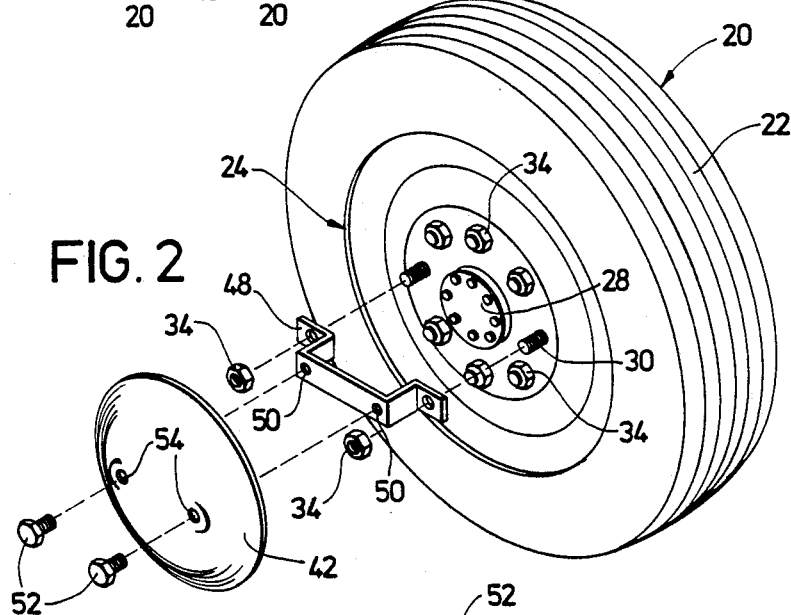
FIG. 2 is an exploded perspective view of a wheel and the wheel hub cover apparatus of the preferred embodiment of the present invention.

As shown in FIG. 2, each wheel 20 includes a tire 22 supported in a conventional manner on a hub 24 of known construction. The wheel need not be modified in any way to permit its use with the wheel hub cover apparatus of the present invention and the wheel itself makes up no part of the present invention.

The wheel hub 24 is supported on the tower 10 by a mounting structure, such as a gear shaft 26 of a drive mechanism, by a centering protrusion 28 of the gear shaft and by a plurality of studs 30, all of which extend through holes 32 provided in the hub 24. Once located properly on the gear shaft 26, with all of the holes 32 aligned with the protrusion 28 and studs 30 of the gear shaft, the wheel 20 is secured to the gear shaft 26 by a plurality of lug nuts 34 or the like which mate with the studs 30 to fasten the hub to the gear shaft.

Figure 3:
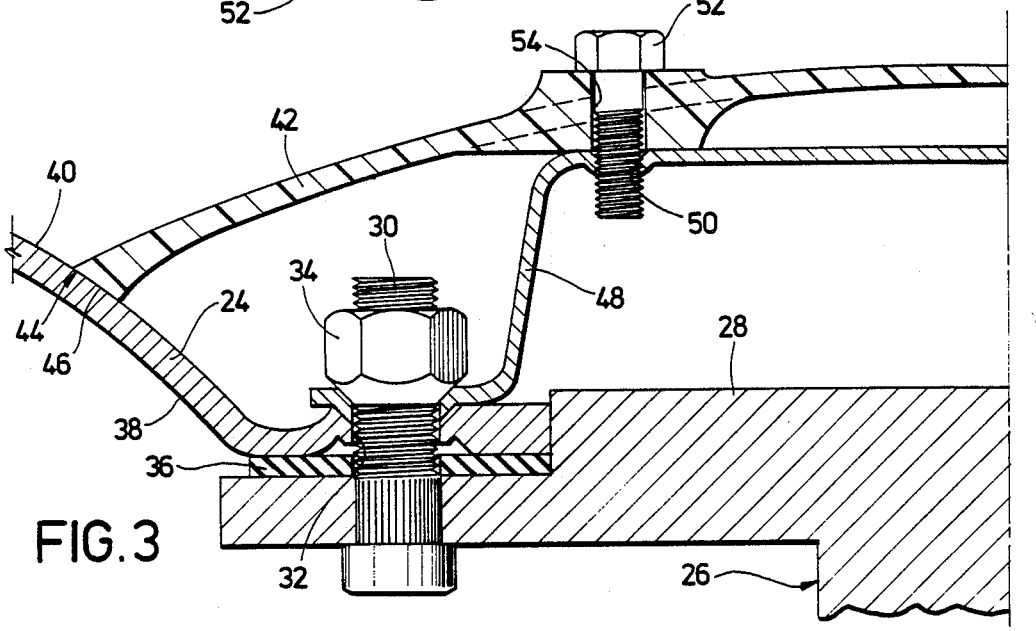
FIG. 3 is a partial sectional view of a wheel and an associated mounting structure, including the hub cover apparatus of the preferred embodiment.

A wheel hub cover apparatus constructed in accordance with the present invention is shown in FIG. 3, as used with the wheel discussed above. The cover apparatus includes first sealing means including a gasket 36 adapted to extend around the periphery of each of the holes 32 of the hub and to fit between the hub and the gear shaft 26 when the hub is secured to the gear shaft. By providing this gasket 36 between the hub and gear shaft, the portion of the hub adjacent the holes 32 are protected from exposure to fluids that are present in the vicinity of the inner surface 38 of the hub during operation of the irrigation system.

The gasket 36 of the first sealing means preferably includes a single gasket member constructed of a suitable resilient material such as rubber, and is of a generally annular shape, having a central aperture and a plurality of holes provided around the circumference thereof which are sized somewhat larger than the holes 32 in the hub and which may be aligned with the holes.

Second sealing means are also provided on the cover apparatus for protecting the portion of the hub adjacent the holes 32 from exposure to fluids that are present in the vicinity of the outer exposed surface 40 of the hub 24. This second sealing means includes a cover 42 having an edge 44 adapted to contact the outer surface of the hub along a closed path surrounding the periphery of the holes 32, wherein the closed path defines a region of the outer surface of the hub that is protected by the cover 42 from exposure to fluids that are present in the vicinity of the outer surface 40 of the hub 24.

The cover 42 is preferably formed of a resilient material such as plastic, and is shaped to cooperatively mate with the surface 40 of the hub to substantially seal the central portion of the hub from exposure to fluids during operation of the irrigation system. In addition, the edge 44 of the cover preferably is formed with a flat or concave edge surface 46 that engages the outer surface 40 of the hub 24 during attachment of the cover 42 to the wheel 20 and presses against the outer surface to form a seal against the hub.

The cover 42 is attached to the hub 24 by an attachment bracket 48 that is fixed to the wheel 20 by interposing the bracket on an opposing pair of the studs 30 between the hub 24 and the lug nuts 34. Once fastened to the wheel, the bracket 48 presents a pair of threaded apertures 50 for receiving attachment bolts 52 passing through a pair of aligned openings 54 in the cover 42. By tightening the attachment bolts 52 against the cover 42 during installation of the apparatus, the bolts 52 form their own seal against the resilient material of the cover 42 and protect against leakage through the openings 54 of the cover.

Once assembled, the wheel hub cover apparatus of the present invention protects both the inner and outer surfaces 38, 40 of the wheel hub 24 from exposure to harmful fluids in the region including the holes through which the studs 30 of the gear shaft 26 pass. Thus, this region is shielded from the effects of oxidation and rusting so as to enjoy a longer useful life than unprotected wheels used in a similar environment. It is noted that although the wheel hub cover apparatus is described with reference to the irrigation system illustrated in FIG. 1, it is possible to employ the inventive wheel hub cover apparatus with wheels of any of several known constructions in any known environment to protect the hub from the corrosive effects of fluids that exist in the vicinity of the wheel.

The method of installing the wheel hub cover apparatus on the hub of the wheel is illustrated in FIG. 2, and includes first positioning the gasket 36 on the gear shaft 26 with the gasket arranged in alignment with the shaft to present the holes of the gasket to the studs 30 of the gear shaft.

Thereafter, the hub 24 is positioned on the gear shaft 26 with the holes 32 in the hub fitting onto the studs of the shaft and with a central aperture of the hub fitting over the protrusion 28 of the gear shaft. Once the hub is properly oriented on the gear shaft, all but two opposing studs are fitted with nuts and the nuts are tightened to secure the hub 24 to the gear shaft 26 such that the gasket 36 is pressed between the hub and the gear shaft and the portion of the hub adjacent the holes 32 are protected from exposure to fluids that are present in the vicinity of the inner surface 38 of the hub 24.

The attachment bracket 48 is then arranged on the two exposed opposing studs 30 and nuts are fitted on the studs and tightened against the bracket to hold the bracket in place relative to the hub. The bracket 48 thus presents the threaded apertures 50 permitting attachment of the cover 42 to the wheel 20 merely by positioning the cover over the bracket 48 with the openings 54 in the cover aligned with the apertures 50 and by inserting the attachment bolts 52 as shown in the figures. By tightening these bolts against the outer surface of the cover, a self-sealing is carried out by the compression of the cover material that occurs under the load of the heads of the bolts thereagainst.

If it is desired to replace the wheel 20 at a later time after installation of the hub cover apparatus, it is only necessary to remove the attachment bolts 48 of the cover 42, loosen and remove all of the lug nuts 34, and change the wheel in the manner already discussed.

Although the invention has been described with reference to the illustrated preferred embodiment, it is noted that substitutions may be made and equivalents employed herein without departing from the scope of the invention as recited in the claims.

What is claimed is:

1. For use with a wheel having a hub adapted to be secured to a mounting structure by at least one stud extending through a hole in the hub and by a nut fastened to the stud, the hub including a first surface facing the mounting structure and a second surface opposed to the first surface, a wheel hub cover apparatus for protecting a portion of the hub adjacent the hole against exposure to fluids, the wheel hub cover apparatus comprising:

first sealing means adapted to extend around the periphery of the hole and between the first surface of the hub and the mounting structure when the hub is secured to the mounting structure for protecting the portion of the hub adjacent the hole from exposure to fluids that are present in the vicinity of the first surface of the hub;

second sealing means for protecting the portion of the hub adjacent the hole from exposure to fluids that are present in the vicinity of the second surface of the hub, the second sealing means including a cover having an edge adapted to contact the second surface of the hub along a closed path surrounding the periphery of the hole and defining a region of the second surface of the hub that is protected by the cover from exposure to fluids that are present in the vicinity of the second surface of the hub.

2. The wheel hub cover apparatus as recited in claim 1, wherein the hub includes a plurality of holes and is adapted to be secured to the mounting structure by a plurality of studs extending through the holes and by nuts fastened to the studs, the first sealing means surrounding the periphery of each hole to protect the portion of the hub adjacent each hole from exposure to fluids that are present in the vicinity of the first surface of the hub.

3. The wheel hub cover apparatus as recited in claim 1, wherein the hub includes a plurality of holes and is adapted to be secured to the mounting structure by a plurality of studs extending through the holes and by nuts fastened to the studs, the edge of the cover being adapted to contact the second surface of the hub along a closed path encompassing the plurality of holes so that the region of the second surface of the hub that is protected by the cover includes the plurality of holes.

4. The wheel hub cover apparatus as recited in claim 2, wherein the first sealing means includes a gasket adapted to be interposed between the wheel hub and the mounting structure during attachment of the wheel to the mounting structure, the gasket including a plurality of apertures adapted to align with the holes in the hub.

5. The wheel hub cover apparatus as recited in claim 3, wherein the second sealing means includes attachment means for attaching the cover to the wheel hub, the attachment means including an attachment bracket, means for securing the attachment bracket to at least one of the studs, and means for fastening the cover to the attachment bracket.

6. The wheel hub cover apparatus as recited in claim 1, wherein the edge of the cover includes a flat edge surface that engages the second surface of the hub during attachment of the cover to the wheel and presses against the second surface to form a seal against the hub.

7. The wheel hub cover apparatus as recited in claim 1, wherein the edge of the cover includes a concave edge surface that engages the second surface of the hub during attachment of the cover to the wheel and presses against the second surface to form a seal against the hub.

8. A method of installing a wheel hub cover apparatus on a wheel having a hub adapted to be secured to a mounting structure by at least one stud extending through a hole in the hub and by a nut fastened to the stud, the hub including a first surface facing the mounting structure and a second surface opposed to the first surface, the method comprising the steps of:

positioning a gasket on the mounting structure with the gasket extending around the periphery of the hole;

aligning the hole in the hub with a stud provided on the mounting structure and placing the wheel on the mounting structure with the stud extending through the hole of the hub and with the gasket pressed between the hub and the mounting structure so that the a portion of the hub adjacent the hole is protected from exposure to fluids that are present in the vicinity of the first surface of the hub;

fastening a nut on the stud to secure the wheel on the mounting structure;

attaching a wheel hub cover to the hub, the cover having an edge that contacts the second surface of the hub along a closed path surrounding the periphery of the hole and defining a region of the second surface of the hub that is protected by the cover from exposure to fluids that are present in the vicinity of the second surface of the hub.

9. The method as recited in claim 8, further comprising the steps of fastening an attachment bracket to the stud prior to fastening the nut on the stud, and securing the cover to the attachment bracket, the cover thus being attached to the hub by the attachment bracket.

* * * * *